April 11, 1961 W. H. DAILEY, JR 2,979,322
FURNACE PRESSURE CONTROL
Filed April 3, 1957 3 Sheets-Sheet 1

INVENTOR.
WILLIAM H. DAILEY, JR.
BY
Charles S. Haughey
att'y

April 11, 1961  W. H. DAILEY, JR  2,979,322
FURNACE PRESSURE CONTROL
Filed April 3, 1957  3 Sheets-Sheet 3

INVENTOR.
WILLIAM H. DAILEY, JR.
BY
Charles S Haughey
atty

2,979,322
Patented Apr. 11, 1961

2,979,322

FURNACE PRESSURE CONTROL

William H. Dailey, Jr., Toledo, Ohio, assignor, by mesne assignments, to Midland-Ross Corporation, Cleveland, Ohio, a corporation of Ohio Filed Apr. 3, 1957, Ser. No. 650,482

8 Claims. (Cl. 263—40)

This invention relates to control of furnace atmosphere pressure by use of a power ejector stack, and to the control of the ejector stack. It is common practice to employ ejector stacks with a soaking pit installation to exhaust the flue gases from the furnace, and, where recuperators are used, to draw the flue gas through the appropriate passages of a recuperator. Under various conditions of firing rates, heat load in the furnace and the like the ejector should be controlled to produce the desider draft upon the furnace, and in some cases, such as low firing rates in non-recuperative pits, a reverse or static pressure is desirable to maintain the proper pressure in the pit. The jet nozzles or dampers usually employed in the flue gas stream are subjected to severe temperature conditions up to 2200° F. and varied conditions of oxidation as when proportioning controls are poorly adjusted or when a pit is uncovered for charging or discharging. This invention provides an improved annular jet nozzle and vortex damper system for exhausting gases from and controlling pressure within an exhaust system; and is herein, for purposes of illustration, described as applied to a one-way fired recuperative soaking pit battery.

The invention affords substantially complete control over the volume and pressure of the gases within an exhaust system with the advantages of space economy and reduced construction cost without subjecting the control means to severe temperature conditions.

The invention also lends itself to being readily incorporated in existing exhaust systems with a minimum of labor and cost.

The annular jet nozzle is provided to create a low pressure region in the exhaust stack and thus induce flow from the furnace chamber through the stack whenever the pressure within the chamber is above a predetermined maximum limit; conversely, the vortex damper is provided to create a high pressure region which will restrict flow from the furnace chamber whenever the pressure within the chamber approaches a predetermined minimum limit. It is preferred to employ a vortex damper which produces a whirling stream of air which will dampen the exhausting gases rather than a radial stream, for it has been found that the whirling stream is capable of creating a blocking or dampening effect 1.5 to 2 times that of a radial stream.

The "blocking effect" may be defined as the ratio of the force of the jet air emitted transverse to the axis of the stack and the force of the axial momentum of the jet air.

As indicated by the following test data the best blocking effect is obtained when the incoming flue gas flow is set at 0 and when the vortex damper air is discharged upwardly through the stack. The test data also indicates that the blocking effect when the vortex damper is allowed to proceed backwardly to the furnace is only 80% of the jet momentum in an axial direction.

| | A<br>Outlet open—<br>entry closed<br>Inlet flow at 0 | B<br>Outlet closed—<br>entry open |
|---|---|---|
| Momentum from jet | 3# | 1.68# |
| Momentum in axial direction | 1.6# | 2.08# |

Blocking effect "A" = $\frac{\text{Opposing force}}{\text{Axial momentum}} = \frac{3\#}{1.6\#} = 1.9$.

Blocking effect "B" = $\frac{\text{Opposing force}}{\text{Axial momentum}} = \frac{1.68\#}{2.08\#} = .81$.

Basically, the reason for the great blocking effect obtainable with the vortex damper is due to the high whirling velocity accompanying the downward flow of the damper jet air. This high degree of whirl tends to keep the downward flow along the periphery of the inlet to the stack. In order to escape up through the discharge of the stack this flow with the high radial components must turn inwardly against the centrifugal force and then flow upwardly through the central portion. However, as soon as the flow starts upwardly through the central portion, the whirling components remaining plus the additional whirl induced by the downwardly flowing gases tend to make the flow outward again. As a result, each gas particle is probably circulated many times, first flowing downwardly along the wall; then starting upwardly through the center of the stream only to be induced downwardly again so that there is several times as much gas in circulation in the stack inlet as reaches the outlet into the stack venturi.

For a consideration of what I believe to be novel and my invention, attention is directed to the following specification and the drawing and concluding claims thereof.

Figure 1:
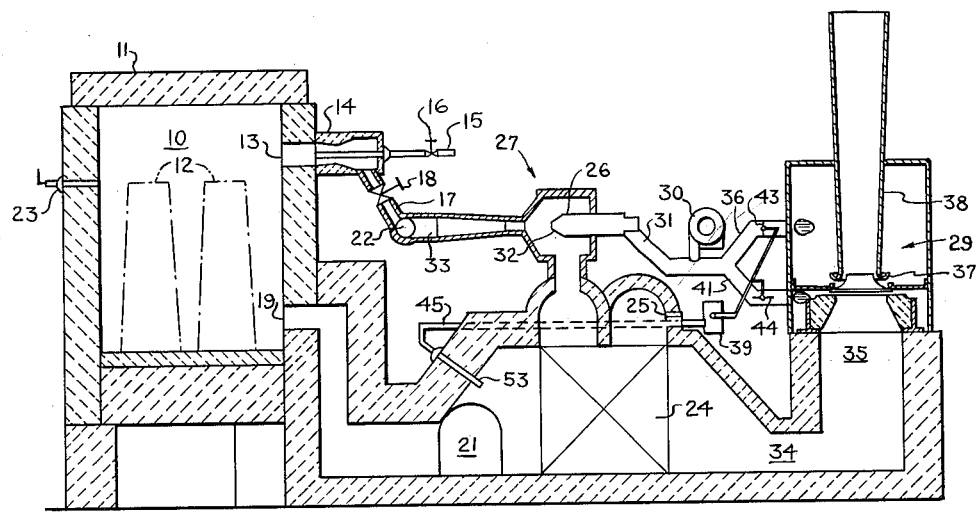
Fig. 1 is a diagrammatic illustration of apparatus embodying this invention.

The soaking pit comprises a combined combustion and heating chamber 10 which is normally closed by a removable cover 11, the chamber being of a size to contain a plurality of steel ingots 12 indicated in outline by discontinuous lines. Heating flame enters the chamber 10 from a firing port 13 whose inlet is coincident with the outlet of a burner 14 to which fuel is delivered by supply pipe 15 having a control valve 16 and to which air for combustion is delivered by a duct 17 having a control valve 18. Flue gas (products of combustion) is vented from the chamber 10 through an exhaust port 19. The heating unit thus far described is not new and is usually one of several units having a common flue gas exhaust manifold 21 and a common burner air distributing manifold 22.

The rate of fuel supply through the furnace chamber 10 will ordinarily be determined by means, not shown, responsive to a radiation device 23 for measuring the temperature within the chamber, said means being adapted to adjust the fuel control valve 16 to maintain the desired furnace temperature. A predetermined ratio of fuel and air will ordinarily be delivered to the burner 14, according to conventional practice, as by adjusting the air valve 18 responsive to the adjustment of the fuel valve.

Air may be delivered to the air manifold 22 by any conventional means, and may be preheated by a recuperator as herein shown. Air is drawn into a recuperator 24 through entry port 25 and is heated in the recuperator before passing into the plenum chamber 26 of a jet pump 27 from which it is inspirated by a jet of air from a compressor 30, pipe 31, and jet nozzle 32 and delivered by pipes 33 and 22 to the air duct 17 and to the burner 14.

Flue gases from the chamber 10 pass through the exhaust port 19 to the exhaust manifold 21, through the recuperator 24 wherein some of its heat is transferred to the air drawn therethrough, and thence through exhaust duct 34 to an ejector 35 where an annular jet of air from the compressor 30, through pipe 36, chamber 29 and an annular nozzle 37 inspirates exhaust flue gases from the duct 34 and delivers them through a venturi stack 38 of the ejector 35.

The annular nozzle 37 comprises a flared portion at the lower end of the Venturi stack 38 storied in relation to and cooperating with an annular flange extension member 46 of the ejector 35 to provide a narrow annular space through which air under pressure is admitted and entrains flue gases from the exhaust duct 34. Ordinarily the exhaust flue gases passing the normal type of damper in the exhaust stack may reach a temperature of 2200° F. under some circumstances, especially where a recuperator is not used, but will ordinarily be about 1400° F. The motive air passing through the annular nozzle 37 is a constant coolant which prevents possible overheating of the nozzle 37 and provides a control of the draft provided by the ejector. In service the annular nozzle normally operates at a temperature of 800° F.–1000° F.

A vortex damper 40 is provided to control when a furnace is at "soaking" temperature but is firing at a low or holding rate. An annular jet of air from the compressor 30, pipe 41 and an annular nozzle 42 is tangentially admitted into the ejector 35 and expands centrifugally as it proceeds downwardly into the furnace flue as a result of the special contours and tangential flow components of the vortex damper 40.

The vortex damper 40 is intermediately located between the ejector 35 and the extension member 46. The damper 40 may comprise a peripheral continuous flange 47 depending from the extension member 46 in spaced relation to a precast member 48 which is superjacent to and forms a part of ejector 35. The member 48 has a frusto-conical inner passage 54 coaxial with the ejector 35 and stack 38 which flares outwardly at the upper end 55. Such frusto-conical passage not only serves as a transition from the large diameter, low velocity area, of the duct 34 to the smaller diameter, high velocity area, of the Venturi stack 38 but also serves to produce a component of motion toward the chamber 10. The flange 47 and the flared side wall portion 55 of member 48 cooperate to define the nozzle 42 which directs the circulating air in paths countercurrent to the path of the exhausting flue gases.

Figure 2:
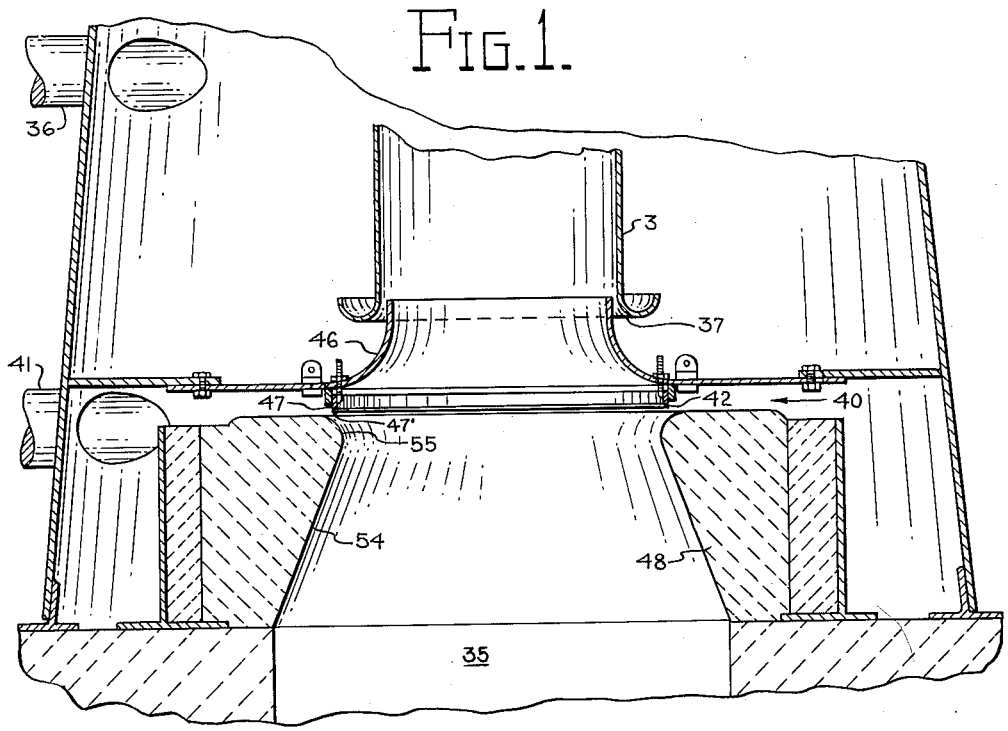
Fig. 2 is an elevational sectional view of the annular jet nozzle and vortex damper, enlarged to show in more detail the construction thereof.

The flange 47 is provided with an end portion 47' of a design which serves to sharply interrupt the flow of air contiguous thereto and direct them downwardly toward member 48. While a sharp edge at the outer periphery of the flange is shown in Fig. 2, any configuration that serves to direct the air downwardly rather than upwardly may be employed.

Figure 6:
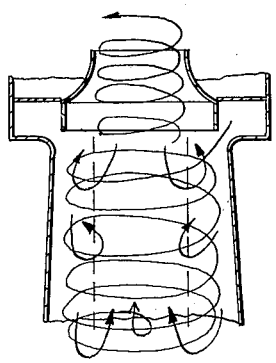
Fig. 6 is a schematic illustration of the centrifugal and upward flow of the dampening air in the subject invention.
Figure 7:
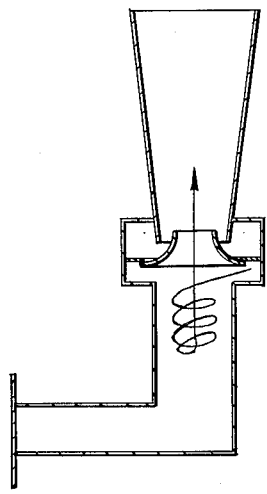
Fig. 7 is a schematic illustration of the blocking effect of the vortex damper air when allowed to proceed upwardly.

The high degree of whirling velocity accompanying the downward flow of the tangentially admitted damper jet air tends to keep the downward flow along the periphery of the member 48. As the whirling motion of the air is expanded the air turns inwardly to flow upwardly through the center of the whirling mass (Fig. 6). In effect, it is similar to trying to make the gas flow backward through a centrifugal fan when the impeller is rotating. To do this, it is necessary to overcome the total pressure rise due to the centrifugal force on the rotating blades before there is any flow inward and backward out through the inlet to the fan.

Figure 8:
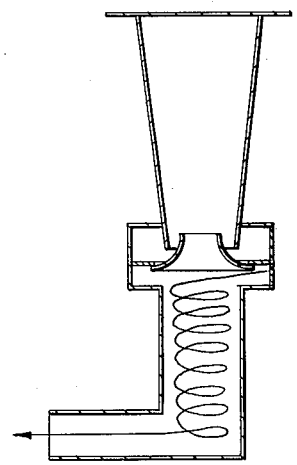
Fig. 8 is a schematic illustration of the blocking effect of the vortex damper air when allowed to proceed backwardly.

A pressure operated control 39 is provided to automatically position dampers 43 and 44 in pipes 36 and 41 respectively to compensate for changes in flue gas pressure upstream from the jet damper, for example, to compensate for pressure changes in the soaking pit, as transmitted to the control 39 through a line 45 from pressure tap 53. When the pressure in the soaking pit is below a predetermined minimum, the damper 43 is closed by the control 39 and the damper 44 is opened an amount which is an inverse function of the indicated pressure. When the pressure in the soaking is above a predetermined maximum, the damper 44 is closed, and the damper 43 is opened an amount which is a direct function of pressure in the soaking pit. When the chamber 10 is uncovered (a condition schematically shown in Fig. 8), the dampers 43 and 44 assume positions that create a back pressure in the chamber to deter the infiltration of "outside" air into the chamber.

The dampers 43 and 44 are sized to provide a minimum flow of air to the nozzles 42 and 37 respectively even when completely closed thus furnishing a constant cooling medium for the nozzles. Since the minimum flow through one of the nozzles represents only a very small percentage of the total flow, such minimum flow does not materially influence the operation of the other nozzle.

Figure 3:
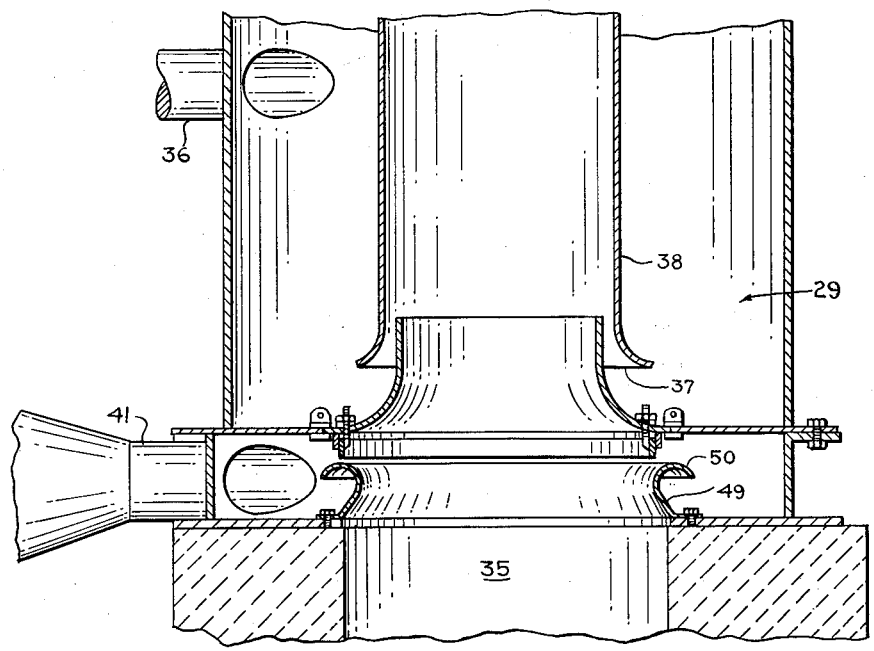
Fig. 3 is a view similar to Fig. 2 of an alternate vortex damper design.
Figure 4:
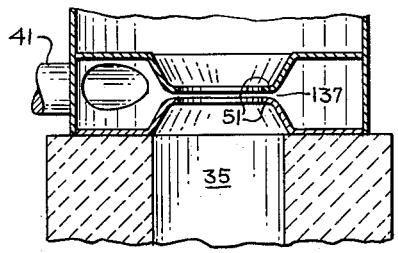
Figs. 4 and 5 are cross-sectional views of alternate damper nozzles.
Figure 5:
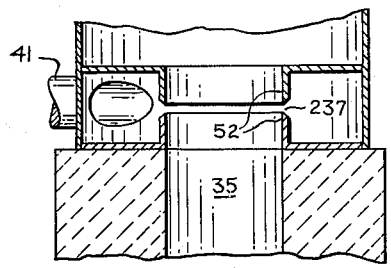

Although the preferred construction of a damper nozzle for the exhaust system has been described, it is to be understood that the damper and nozzle may take different forms, some of which are shown in Figs. 3, 4, and 5.

Fig. 3 shows a metallic annular inner sleeve 49 having a similar conicity and flared portion 50 as the side wall of precast member 48 and substituted therefor.

Fig. 4 discloses a nozzle 137 formed by a pair of flared lips 51 to direct an annular flow of air into the ejector 35 and create a dampering action while Fig. 5 discloses a nozzle 237 formed by a pair of sharp edged depending flanges 52.

The combination of the jet nozzle and vortex damper herein disclosed makes possible a simple yet accurately adjustable ejector whose annular nozzles are continuously internally cooled by flow of air therethrough, and are capable of being adjusted from full draft as for high firing rates on a cold pit, to a dampened position which maintains a pit under desirable positive pressure even at low firing rates on a hot and "soaking" pit, counteracting the excessive draft of even the short stack at low, holding firing rates. The use of the vortex damper enables the application of suction or back pressure to the flue connecting to a soaking pit, slab heater or similar furnace, without regard to the firing rate and enables the maintenance of such a pressure even though no fuel or air is being burned therein. Since the jet nozzle and vortex damper have no heated metal parts the major use of finer alloy as presently used in flue dampers will be eliminated.

I claim:

1. In a furnace having wall means forming a combustion and heating chamber and an outlet for flue gases therefrom, burner means for supplying heating gases to such chamber, and flue means forming an exhaust flue from said outlet, the improvement which comprises, in combination: a first motive fluid nozzle arranged to direct a pressurized fluid in a direction away from said chamber for exhausting flue gases from said chamber through said exhaust flue; a second motive fluid nozzle arranged to direct a pressurized fluid tangentially into the flue to form a vortex having a component of motion towards the combustion chamber; first and second conduits for supplying pressurized fluid to said first and second nozzles respectivtly; and control means responsive to pressure of said flue gases upstream of said nozzles for controlling the flow of pressurized fluid through said first and second conduit means in a manner to reduce flow through said first conduit and increase flow through said second conduit as pressure decreases, and increase flow through said first conduit and reduce flow through said second conduit as pressure increases in a manner to maintain said pressure substantially constant.

2. Apparatus according to claim 1 wherein said first motive fluid nozzle is located downstream of said second motive fluid nozzle.

3. In a furnace having wall means forming a combustion and heating chamber and an outlet for flue gases therefrom, burner means for supplying heating gases to said chamber, and flue means forming an exhaust flue from said outlet, the improvement which comprises, in combination: wall means defining a second chamber of substantially circular cross-section circumposing a portion of said flue means, said wall means also defining an opening for admitting a fluid stream into said chamber; means for delivering a whirling angular fluid stream to said second chamber at a sufficient velocity to maintain a rotating vortex motion; a first flange member within said second chamber and positioned with said flue means to define a restricted and substantially unobstructed circular opening for admitting said fluid stream into said flue means, said first flange member also being arranged to impart a component of motion to said fluid stream towards the heating chamber; wall means defining a third chamber which circumposes another portion of said flue means, said wall means also defining an opening for admitting a fluid stream into said third chamber; and a second flange member positioned with said flue means to define a restricted angular opening into said flue means, said second flange member also being arranged to direct the fluid stream downstream of the flue gases and thereby entrain and exhaust said flue gases.

4. A combination as described in claim 3 comprising means for providing a constant minimum flow of air to and operatively associated with said second and third chambers to maintain a constant cooling action within said chambers.

5. In an exhaust system, the combination comprising: an exhaust passage forming an outlet for flue products; detachable wall means defining a chamber in axial alignment with and circumposing a portion of said exhaust passage; an apertured partition wall in said chamber defining upper and lower compartments, each of said compartments having an opening in the outer wall; said upper compartment having a restricted and substantially unobstructed circular inner opening into said flue means and means for delivering a volume of air into said upper compartment through the opening of its outer wall and through the inner opening into said flue means and with a sufficient velocity to entrain and exhaust said flue products; an annular depending flange detachably and slidably secured to said partition wall in axial alignment with the aperture in said partition wall and extending downwardly into said lower compartment; a conduit member having an aperture of frusto-conical cross-section detachably secured in said lower compartment in spaced apart relationship with said depending flange to define an annular nozzle; means for supplying air to said lower compartment and through said annular nozzle for restricting the flow of flue products through said exhaust passage.

6. The combination as described in claim 5 wherein said apertured partition wall comprises: a skirted annular portion terminating into said aperture.

7. The combination as described in claim 5 comprising: means for adjusting the height of the annular depending flange and thereby vary the opening of said annular nozzle.

8. In a furnace having wall means forming a combustion and heating chamber and an outlet for flue gases therefrom, burner means for supplying heating gases to said chamber, and flue means forming an exhaust flue from said outlet, the improvement which comprises, in combination: an apertured member superjacent to and forming an extension of said flue means, the aperture in said member being of substantially frusto-conical shape with a flared top portion; an annular depending flange storied above and co-axially with said apertured member, there being an annular space separating said flange and flared portion of said apertured member, which space is in communication with the interior of said aperture; and means for supplying air to said aperture through said annular space for restricting flow of flue gases from said chamber.

References Cited in the file of this patent

UNITED STATES PATENTS

| Number | Name | Date |
|---|---|---|
| 468,306 | Sahler | Feb. 2, 1892 |
| 1,189,623 | Reid | July 4, 1916 |
| 1,488,051 | McDonough et al. | Mar. 25, 1924 |
| 1,612,838 | Schutz | Jan. 4, 1927 |
| 1,869,891 | Giesl-Gieslingen | Aug. 2, 1932 |
| 2,120,563 | Lamb | June 14, 1938 |
| 2,397,870 | Kneass | Apr. 2, 1946 |
| 2,722,372 | Edwards | Nov. 1, 1955 |
| 2,744,687 | Dailey | May 8, 1956 |

FOREIGN PATENTS

| Number | Country | Date |
|---|---|---|
| 281,969 | Great Britain | Dec. 15, 1927 |